(12) United States Patent
Matsudo et al.

(10) Patent No.: US 7,456,555 B2
(45) Date of Patent: Nov. 25, 2008

(54) ANGULAR VELOCITY SENSOR AND METHOD OF FABRICATION THEREOF

(75) Inventors: Hideryo Matsudo, Saitama (JP);
Masahiro Yoshimatsu, Saitama (JP);
Takahiro Inoue, Saitama (JP); Kenichi Kikuchi, Saitama (JP)

(73) Assignee: Nihon Dempa Kogyo Co., Ltd., Tokyo (JP)

( * ) Notice: Subject to any disclaimer, the term of this patent is extended or adjusted under 35 U.S.C. 154(b) by 285 days.

(21) Appl. No.: 11/338,345

(22) Filed: Jan. 24, 2006

(65) Prior Publication Data
US 2006/0162449 A1    Jul. 27, 2006

(30) Foreign Application Priority Data
Jan. 25, 2005 (JP) .............................. 2005-016785

(51) Int. Cl.
*H03H 9/21* (2006.01)
(52) U.S. Cl. .................. 310/370; 73/504.02; 73/504.16
(58) Field of Classification Search .................. 310/348, 310/370; 73/514, 504
See application file for complete search history.

(56) References Cited

U.S. PATENT DOCUMENTS

| 7,015,631 | B2 * | 3/2006 | Hirasawa et al. ............. 310/370 |
| 7,205,708 | B2 * | 4/2007 | Yamada ....................... 310/370 |
| 2002/0189061 | A1 * | 12/2002 | Kim et al. ................... 29/25.35 |

FOREIGN PATENT DOCUMENTS

| JP | 2001-330440 | 11/2001 |
| JP | 2005094670 A | * 4/2005 |

* cited by examiner

*Primary Examiner*—Jaydi SanMartin
(74) *Attorney, Agent, or Firm*—Scott D. Wofsy; Edwards Angell Palmer & Dodge LLP

(57) ABSTRACT

The present invention provides an angular velocity sensor and a method of fabrication thereof that facilitates the work of affixing a tuning-fork-type crystal element and adjusting the same, preventing waste caused by scrapping defective products and also encouraging miniaturization of components. The angular velocity sensor comprises: a tuning-fork-type crystal element which is provided with a drive electrode for exciting the vibration of the tuning fork and a sensor electrode for detecting an electrical charge that is generated in response to an angular velocity that is being detected; an independent pedestal to which a main surface of a tuning-fork base portion of the tuning-fork-type crystal element is previously affixed to form an integrated unit; a main package for surface mounting, in which the tuning-fork-type crystal element is hermetically sealed and which has a cavity with an inner base surface to which the pedestal integrated with the tuning-fork-type crystal element is affixed; and an IC having an oscillation circuit for driving the tuning-fork-type crystal element and a signal processing circuit for creating a signal in correspondence to the angular velocity corresponding to the electrical charge, and which is also disposed either inside or outside the package. The pedestal has a weight and/or shape that ensures that the center of gravity of the tuning-fork-type crystal element that is integrated therewith moves towards the tuning-fork base portion side, maintaining the horizontal alignment of the tuning-fork-type crystal element.

12 Claims, 5 Drawing Sheets

ANGULAR VELOCITY SENSOR AND METHOD OF FABRICATION THEREOF

FIELD OF THE INVENTION

The present invention relates to an angular velocity sensor and a method of fabrication thereof, and, in particular, to an angular velocity sensor which facilitates the work of fixing the tuning-fork-type crystal element to a pedestal and performing fine adjustments (trimming) thereon, in a smaller package.

BACKGROUND OF THE INVENTION

Angular velocity sensors (rate gyros) are used in systems such as guidance devices for automobiles (called as car navigation systems) and hand-shake prevention devices for cameras, and the requirements placed on them tend to increase every year. These angular velocity sensors have recently started to appear in other type of electronic devices and thus they are required to be smaller.

PRIOR ART

Figure 6A:
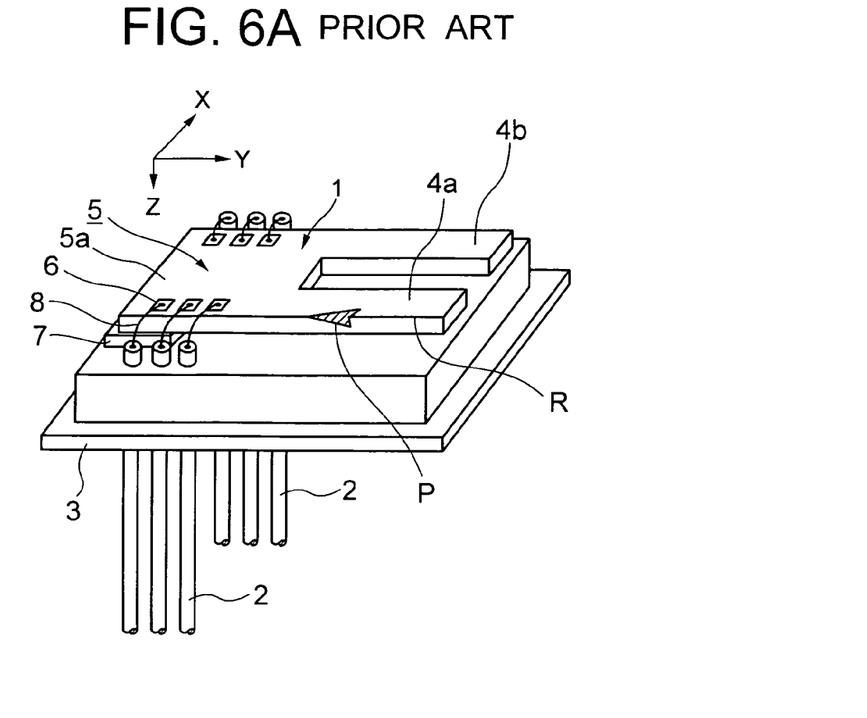
FIG. 6A is a perspective view of the angular velocity sensor with the cover removed and FIG. 6B is a perspective view of the tuning-fork-type crystal element.
Figure 6B:
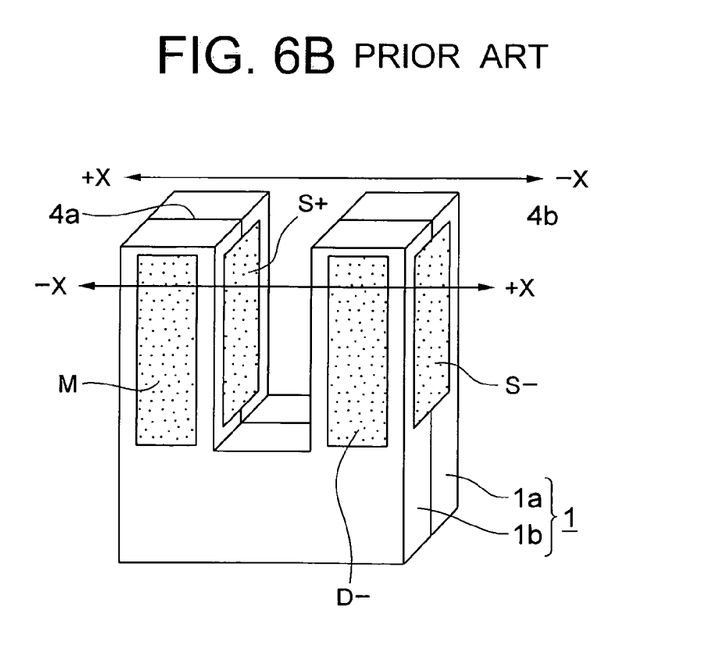

An example of a prior-art angular velocity sensor of this type is shown in FIGS. 6A and 6B, where FIG. 6A is a perspective view of the angular velocity sensor with the cover thereof removed and FIG. 6B is a perspective view of a crystal element in the shape of a tuning fork.

In this angular velocity sensor, a tuning-fork-type crystal element 1 from which a plurality of lead wires 2 extend is affixed to a metal base 3, as shown in FIG. 6A, and is covered by a metal cover (not shown in the figures) to hermetically seal it. The tuning-fork-type crystal element 1 is formed from a cut plate having a main surface that is orthogonal to the Z-axis of the crystallization axes (XYZ) shown in FIG. 6A, and has a pair of tuning-fork arms 4a and 4b that extend from a tuning-fork base portion 5. In this case, the X-axis of crystallization of the crystal is the widthwise direction, length is in the Y-axis direction, and thickness is in the Z-axis direction. The tuning-fork-type crystal element 1 is formed by using direct bonding to combine two crystal pieces 1a and 1b that are orientated in opposite positive and negative directions on the X-axis.

In addition, the tuning-fork-type crystal element 1 is provided with a drive (excitation) electrode D− (not shown in the figures) on one main surface of the tuning-fork arm 4a, a monitor electrode M on another main surface thereof, and sensor electrodes S+ and S− (not shown in the figures) on side surfaces thereof. Similarly, the other tuning-fork arm 4b is provided with a drive electrode D− on one main surface, another drive electrode D+ (not shown in the figures) on another main surface thereof, and sensor electrodes S+ (not shown in the figures) and S− on side surfaces thereof. The drive electrodes D, sensor electrodes S, and monitor electrodes M are lead out through extraction electrodes (not shown in the figures) to crystal terminals 6 provided on a main surface of the tuning-fork base portion 5. The other main surface on the lower side of the tuning-fork base portion 5 (hereinafter called as a "tuning-fork base bottom portion 5a") is affixed by adhesive to the pedestal 7 on the front surface of the metal base 3. The pedestal 7 separates the pair of tuning-fork arms 4a and 4b from the front surface of the metal base 3, to prevent contact with the metal base 3 and maintain normal vibration of the tuning fork.

The lead wires 2 of the metal base 3 shown in FIG. 6A function as external terminals that penetrate through the metal base 3 in an insulated manner, to protrude from the front surface thereof. Each of the crystal terminals 6 of the tuning-fork-type crystal element 1 is connected electrically to the corresponding lead wire 2 by wire bonding, using means such as gold wire 8. This connects the drive electrodes D to an oscillation circuit (not shown in the figures) that excites the vibration of the tuning fork, and also connects the sensor electrodes to a signal processing circuit that operates on the basis of an electrical charge that is detected in accordance with Coriolis force corresponding to the angular velocity that is being detected. In this case, the oscillation circuit and signal processing circuit are integrated as an IC which is disposed outside the metal package in which the tuning-fork-type crystal element 1 is hermetically sealed, and which is provided separately on the set substrate (not shown in the figures).

In this prior-art example, the pedestal 7 is first affixed to the metal base 3, so that these two components are integrated beforehand. The tuning-fork base bottom portion 5a of the tuning-fork-type crystal element 1 is then affixed to the pedestal 7. Wire bonding is then used to connect each crystal terminal 6 of the tuning-fork base portion 5 to the corresponding lead wire 2 of the base 3, with the gold wire 8. A ridgeline portion R at a region denoted by P near the root of the outer side of one of the pair of tuning-fork arms 4a and 4b, such as the tuning-fork arm 4a, is then ground to trim (fine adjust) the tuning fork. This alleviates (removes) unwanted components of the vibration of the tuning fork, as will be described later. In this case, the fine adjustment is done by grinding the ridgeline portion R of the tuning-fork arm 4a in an oblique direction, using a cylindrical file (not shown in the figures). Finally, a cover (not shown in the figures) is bonded to the metal base 3 by resistance welding, to hermetically seal in the tuning-fork-type crystal element 1.

Note that the metal base 3 can be formed beforehand in such a manner that the pedestal 7 is integrated with the metal base 3. Note also that unwanted vibration in this case refers to components of vibration in the perpendicular direction (perpendicular components) that are generated by vibration of the pair of tuning-fork arms 4a and 4b in oblique directions. Electrical charges generated by such perpendicular components become noise with respect to the electrical charge generated by Coriolis force. (Refer to Japanese Patent Laid-Open Publication No. 2001-330440.)

However, the above-described angular velocity sensor of the prior art uses the metal base 3 through which the lead wires 2 are extracted, which raises a problem in that it is not suitable for a compact angular velocity sensor designed for applications such as surface mounting. In addition, since the base 3 is of metal, there is another problem in that it is not possible to house components other than the tuning-fork-type crystal element 1 therein, such as the IC that integrates the oscillation circuit and the signal processing circuit.

Figure 7A:
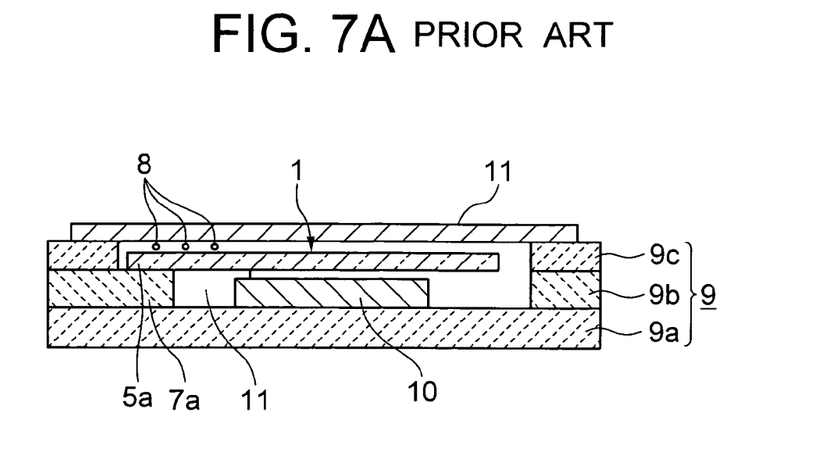
FIG. 7A is a sectional view and FIG. 7B is a plan view without the cover.
Figure 7B:
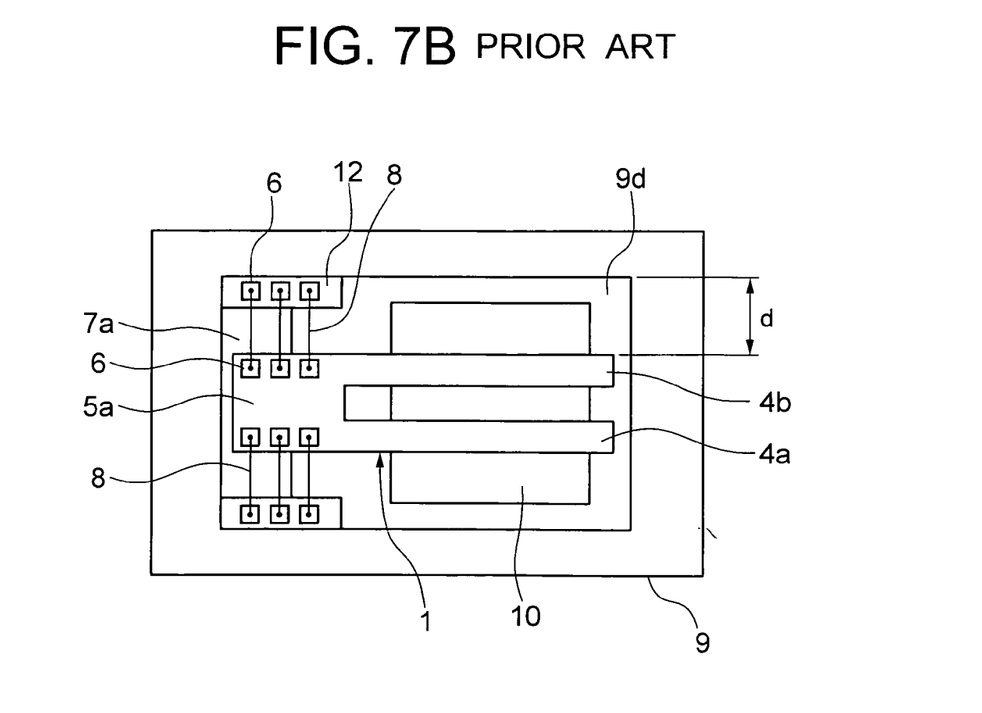

In another prior-art example that has been investigated, a first step portion 7a is provided as the independent pedestal 7 in a main package 9 for surface mounting that has a concave section formed from multiple ceramic plates 9a, 9b, and 9c, the tuning-fork-type crystal element 1 or an IC as a bare chip is housed therein, and the package is sealed hermetically with a cover 11, as shown in FIG. 7A (a plan view) and FIG. 7B (a sectional view). In this case, reference number 12 in FIG. 7A denotes a second step portion, a crystal-receiving terminal 6 is provided on that second the step portions 12 and is connected electrically to one of the crystal-receiving terminals 6 of the tuning-fork-type crystal element 1 by the gold wire 8. The IC 10 is affixed to an inner base surface 9f of the main package 9 by a method such as ultrasonic thermal crimping, using bumps (not shown in the figures).

However, the center of gravity of the tuning-fork-type crystal element 1 of this prior-art example with the extended pair of tuning-fork arms 4a and 4b is further towards the tips (leading ends) of the pair of tuning-fork arms 4a and 4b than at least the tuning-fork base bottom portion 5a affixed to the pedestal 7a. This means that when the bottom surface of the tuning-fork base portion 5a is affixed to the first step portion 7a within the main package 9, the tips of the pair of tuning-fork arms 4a and 4b of the tuning-fork-type crystal element 1 sag so they touch the inner base surface 9f of the main package 9 or the IC 10 (if the IC 10 is integrated into the inner base surface 9f), causing problems with difficult of performing this affixing work.

If the tuning-fork arms 4a and 4b of the tuning-fork-type crystal element 1 were to touch the inner base surface 9f of the main package 9 or the IC 10 in this prior-art example, it would result in a defective product due to damage caused by vibration of those components due to the vibration of the tuning fork. This is wasteful from the manufacturing point of view since it would lead to the scrapping of all the components if the main package 9 or the IC 10, including the tuning-fork-type angular velocity sensor, were housed together within the main package 9.

In addition, the fine adjustment step for removing unwanted vibrations by grinding the ridgeline portion of the tuning-fork arm 4a is still essential in this prior-art example, but after the bottom surface of the tuning-fork base portion 5a of the tuning-fork-type crystal element 1 has been affixed to the step portion 7a of the main package 9 that has a concave section. It is therefore necessary to provide enough of a gap d as shown in FIG. 7B between the main concave package 9 and the tuning-fork arms 4a and 4b to allow for the insertion of the cylindrical file. This therefore makes it impossible to make the external dimensions of the main package 9 smaller in a plan view. In addition, even if the cylindrical file can be inserted therein, the ridgeline portion of the tuning-fork arm is to be ground at an angle, making the adjustment difficult.

SUMMARY OF THE INVENTION

An objective of the present invention is to provide an angular velocity sensor and a method of fabrication thereof that facilitate the work of affixing the tuning-fork-type crystal element to the pedestal and making fine adjustments of the same, increasing the manufacturing productivity by preventing waste and also encouraging miniaturization of the components.

An angular velocity sensor in accordance with the present invention comprises: a tuning-fork-type crystal element which is provided with a drive electrode for exciting the vibration of the tuning fork and a sensor electrode for detecting an electrical charge that is generated in response to an angular velocity that is being detected; an independent pedestal to which a main surface of a tuning-fork base portion of the tuning-fork-type crystal element is previously affixed to form an integrated unit; a main package for surface mounting, in which the tuning-fork-type crystal element is hermetically sealed and which has a cavity with an inner base surface to which the pedestal integrated with the tuning-fork-type crystal element is affixed; and an IC having an oscillation circuit for driving the tuning-fork-type crystal element and a signal processing circuit for creating a signal in correspondence to the angular velocity corresponding to the electrical charge, and which is also disposed either inside or outside the package; wherein the pedestal ensures that the center of gravity of the tuning-fork-type crystal element that is integrated therewith moves towards the tuning-fork base portion side, maintaining the horizontal alignment of the tuning-fork-type crystal element.

A method of fabricating an angular velocity sensor in accordance with the present invention concerns an angular velocity sensor that comprises: a tuning-fork-type crystal element which is provided with a drive electrode for exciting the vibration of the tuning fork and a sensor electrode for detecting an electrical charge that is generated in response to an angular velocity; an independent pedestal to which a main surface of a tuning-fork base portion of the tuning-fork-type crystal element is affixed to form an integrated unit; a main package for surface mounting, in which the tuning-fork-type crystal element is hermetically sealed and which has a cavity with an inner base surface to which the pedestal integrated with the tuning-fork-type crystal element is affixed; and an IC having an oscillation circuit for driving the tuning-fork-type crystal element and a signal processing circuit for creating a signal in correspondence to the angular velocity corresponding to the electrical charge, and which is also disposed either inside or outside the package. This method comprises a first step of affixing the tuning-fork base portion to the pedestal to integrate the tuning-fork-type crystal element and the pedestal; a second step of performing fine adjustment of tuning-fork arms of the tuning-fork-type crystal element by grinding, after the first step; a third step of affixing the pedestal integrated with the tuning-fork-type crystal element to an inner base surface of the main package, after the second step.

Since the angular velocity sensor of the present invention ensures that the center of gravity of the tuning-fork-type crystal element including the pedestal moves towards the tuning-fork base portion side, maintaining the horizontal alignment of the tuning-fork-type crystal element, the tip ends of the tuning-fork-type crystal element can be prevented from touching the inner base surface of the main package when the pedestal that is integrated with the tuning-fork base portion is affixed to the inner base surface of the main package. This facilitates the work of affixing the pedestal of the crystal element. Since the tuning-fork-type crystal element is previously integrated with the pedestal, work such as adjustments to remove unwanted vibration can be done by grinding the tuning-fork-type crystal element before the crystal element is housed in the main package. Thus, if there are any defects in the alignment or adjustment of the crystal element, just the tuning-fork-type crystal element can be scrapped together with the pedestal, preventing the waste that would occur if these components were already disposed in the main package with the IC.

In addition, since the adjustments to remove unwanted oscillation of the tuning-fork-type crystal element can be done before the crystal element is housed in the main package of the angular velocity sensor, there are no limitations on the work space and thus a cylindrical file can be used to adjust the crystal element. There is therefore no need to increase the external dimensions in a plan view of the main package to enable adjustment of the tuning-fork-type crystal element, which encourages miniaturization of the angular velocity sensor. Of course, since a main package for surface mounting is used, an IC can also be housed in the main package if necessary, enabling basic miniaturization overall.

Note that the shape of the pedestal is preferably such that it is somewhat wider than the width of the tuning-fork base portion of the crystal element. This ensures that the tuning-fork-type crystal element is held indirectly by the pedestal when the tuning-fork-type crystal element is fixed to an adjustment circuit in the step of removing unwanted vibration, before being housed in the main package, so that damage to the tuning-fork-type crystal element can be prevented.

The method of fabricating an angular velocity sensor in accordance with the present invention ensures that the tuning-fork-type crystal element is affixed to the inner base surface of the main package in the third step, after the crystal element has been affixed to the pedestal and adjusted in that integrated state in the first and second steps. Defective products discovered during the alignment and adjustment of the tuning-fork-type crystal element can therefore be removed at this point, as described previously, preventing waste caused by scrapping the main package. There are also no limitations on work space so that a cylindrical file or the like can be used for adjusting the crystal element. This prevents any increase in the external dimensions of the main package in a plan view, which can encourage miniaturization of the angular velocity sensor.

In addition, a cavity formed of a single space is formed in the main package of the angular velocity sensor of the present invention, the tuning-fork-type crystal element integrated with the pedestal is housed together with the IC in this cavity, and the IC is affixed to the inner base surface of the cavity. In this case, the pedestal is taller than the IC and is also affixed to the same inner base surface as the IC. Since this ensures that the pair of tuning-fork arms of the tuning-fork-type crystal element are disposed on either side above the IC, the external dimensions in a plan view of the angular velocity sensor can be reduced.

Alternatively, cavities to form two spaces are provided in the main package of the angular velocity sensor of the present invention, the section thereof is made H-shaped, and the tuning-fork-type crystal element is hermetically sealed into one cavity and the IC is disposed in the other cavity. This enables independent housing of the tuning-fork-type crystal element and the IC in separate cavities, thus preventing any adverse effects from outgassing or the like from other components such as the IC chip. For example, it is preferable to vacuum-seal the tuning-fork-type crystal element and this configuration can prevent deterioration of the degree of vacuum.

The pedestal of the angular velocity sensor of the present invention is U-shaped in a plan view such that a pair of perpendicular portions extend from both ends of a horizontal portion, the pair of perpendicular portions is positioned on the outer sides of the tuning-fork base portion so that a gap between the perpendicular portions is greater than the width of the tuning-fork base portion, and the tuning-fork base portion is affixed to the horizontal portion. This ensures that the center of gravity of the pedestal itself is close to the horizontal portion of the U-shape, enabling the center of gravity of the tuning-fork-type crystal element to move towards the tuning-fork base portion side when the bottom surface of the tuning-fork base portion is affixed to the horizontal portion. The crystal element can therefore be held horizontal, without any sagging of the tip ends of the tuning-fork-type crystal element.

In the angular velocity sensor of the present invention, the pedestal is formed in a stepped shape with a thick portion and a thin portion, the thin portion is on the tip side of the tuning-fork-type crystal element, and also the tuning-fork base portion is affixed to the thick portion. Alternatively, the pedestal has an oblique portion that gradually decreases in thickness from a thick portion, the oblique portion is on the tip side of the tuning-fork-type crystal element, and the tuning-fork base portion is affixed to the thick portion. Since this ensures that the center of gravity of the pedestal itself is close to the thicker portion thereof, the center of gravity of the tuning-fork-type crystal element can move towards the tuning-fork base portion side when the tuning-fork base portion is affixed to the thick portion, so that the crystal element can be held horizontal, without any sagging of the tip ends of the tuning-fork-type crystal element.

The method of fabricating an angular velocity sensor in accordance with the present invention provides a second step that is fine adjustment to alleviate unwanted vibration of the tuning-fork-type crystal element. This removes unwanted vibration to make it possible to achieve a highly sensitive angular velocity sensor with little noise.

The method of fabricating an angular velocity sensor in accordance with the present invention also ensures that the center of gravity of the tuning-fork-type crystal element integrated with the pedestal moves towards the tuning-fork base portion side, enabling the fabrication of an angular velocity sensor that has a weight and/or shape that ensures that the tuning-fork-type crystal element is held in a horizontal alignment.

BRIEF DESCRIPTION OF THE DRAWINGS

FIGS. 1A and 1B are illustrative of an angular velocity sensor in accordance with embodiments 1 and 2 of the present invention, where

FIGS. 6A and 6B are illustrative of a prior-art example of an angular velocity sensor, where FIGS. 7A and 7B are illustrative of another prior-art example of an angular velocity sensor, where

DETAILED DESCRIPTION OF PREFERRED EMBODIMENTS

Embodiment 1

Figure 1A:
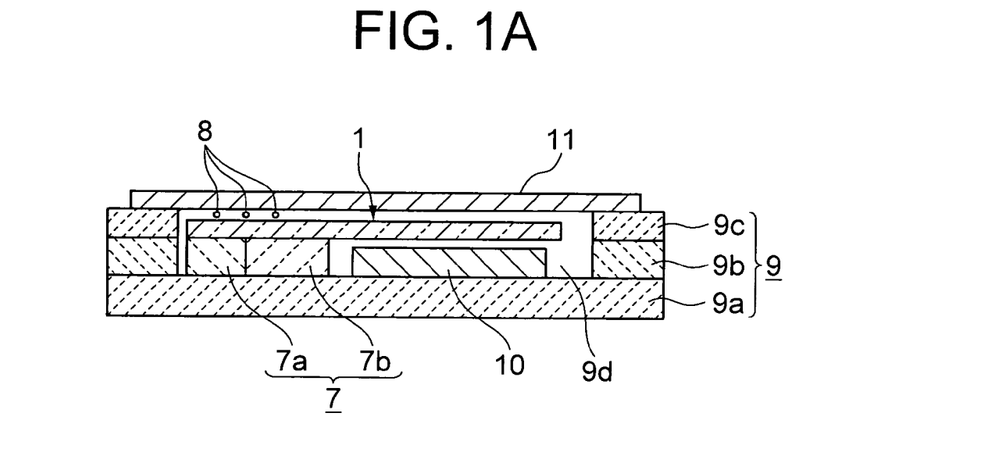
FIG. 1A is a sectional view thereof and FIG. 1B is a plan view without a cover.
Figure 1B:
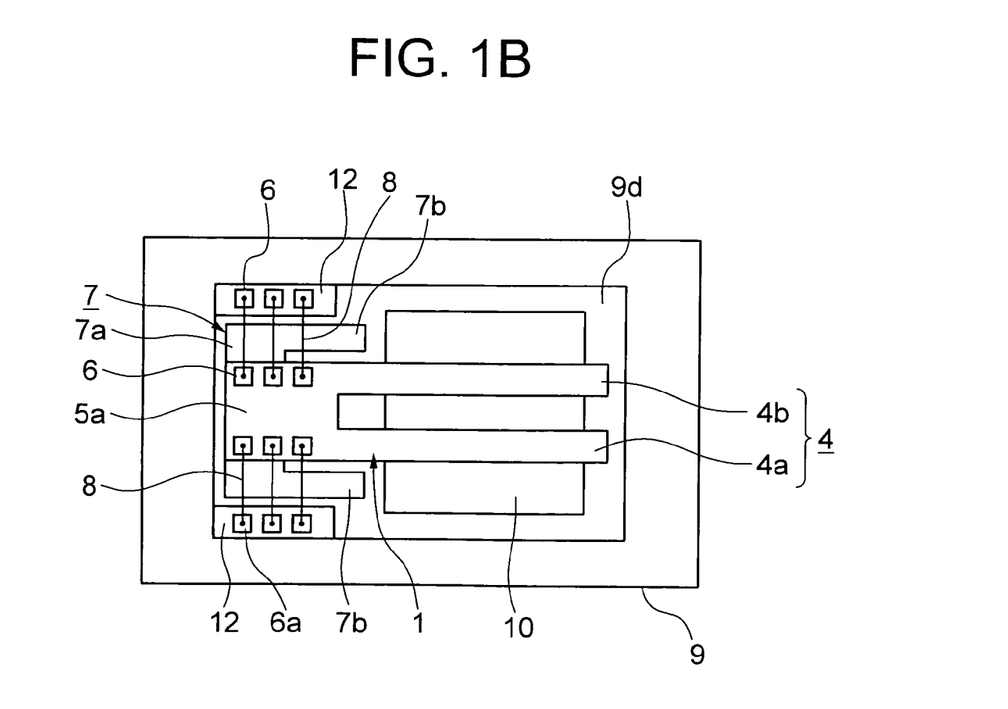

An embodiment of the angular velocity sensor in accordance with the present invention is shown in FIGS. 1A and 1B, with FIG. 1A being a section therethrough and FIG. 1B being a plan view thereof without a cover.

The angular velocity sensor of the present invention is provided with a tuning-fork-type crystal element 1, an IC 10, a pedestal that is formed independently (hereinafter called as "independent pedestal") 7, a main package 9, and a cover 11, as shown in FIGS. 1A and 1B. The tuning-fork-type crystal element 1 is formed by directly bonding together two crystal pieces 1a and 1b that are orientated in opposite positive and negative directions on the X-axis, as shown in FIG. 6B. One tuning-fork arm 4a thereof is provided with a drive electrode D− (not shown in the figures) on one main surface and a monitor electrode on another main surface, with sensor electrodes S+ and S− (not shown in the figures) on the side surfaces thereof. The other tuning-fork arm 4b is provided with a drive electrode D− on one main surface and a drive electrode D+ (not shown in the figures) on another main surface, with sensor electrodes S+ (not shown in the figures) and S− on the side surfaces thereof. Crystal terminals 6 extending from the excitation (drive) electrodes D and the sensor electrodes S are on a main surface of the tuning-fork base portion 5. The IC 10 integrates an oscillation circuit that drives the tuning-fork-type crystal element 1 and a signal processing circuit for processing electrical charges from the sensor electrodes.

The independent pedestal 7 is formed of a material such as a ceramic and has a substantially U-shape in a plan view. A pair of perpendicular portions 7b extend from the ends of a horizontal portion 7a thereof, and in this example the horizontal portion 7a is assumed to be a region (position) of the center of gravity with respect to the lengthwise direction. The thickness of the independent pedestal 7 is uniform and is greater than the height of the IC 10. The gap between the pair of perpendicular portions 7b is greater than the width of the tuning-fork base portion 5. In addition, the pair of perpendicular portions 7b of the independent pedestal 7 are positioned on the outer sides of the tuning-fork base portion 5a and the horizontal portion 7a thereof is affixed to another main (bottom) surface of the tuning-fork base portion 5a, to pre-integrate it with the bottom surface of the tuning-fork base portion 5a.

The main package 9 is adapted for surface-mounting use and is formed of multiple ceramic plates 9a, 9b, and 9c, and also has a cavity 9d that is a single space for mounting terminals in an outer front surface thereof. The IC 10 and an IC-receiving terminal (not shown in the figure) that is connected thereto are disposed in a central region of the bottom surface of the cavity 9d, and step portions 12 on which the crystal-receiving terminals 6a are provided are disposed on both sides of edge portions of the inner walls of the cavity 9d. The IC-receiving terminal (not shown in the figures) is connected to the crystal-receiving terminals 6a and the external front surface of the main package 9 by a conductive pattern. An IC terminal provided on the circuit function surface of the IC 10 is connected electrically and mechanically to the IC-receiving terminal by ultrasonic thermal crimping using a bump, and the IC 10 is affixed to the central region of the cavity 9d.

The independent pedestal 7 that has been integrated with the tuning-fork-type crystal element 1 is affixed to the bottom surface formed between the pair of step portions 12 on the inner walls of the cavity 9d, and the far ends of the tuning-fork arms 4a and 4b that extend from the tuning-fork base portion 5a are disposed on either side above the IC 10. The crystal-receiving terminals 6a provided on the step portions 12 of the inner walls of the cavity are connected electrically to the crystal terminals 6 of the tuning-fork base portion 5a on the independent pedestal 7 by wire bonding using the gold wire 8. The cover 11 is bonded to the upper surface of the main package 9 by means such as seam welding, to seal the open surface of the main package 9.

This configuration ensures that the center of gravity of the tuning-fork-type crystal element 1, including the independent pedestal 7, is moved towards the tuning-fork base portion 5a side by affixing the tuning-fork base portion 5a to the independent pedestal 7. In this case, the independent pedestal 7 is U-shaped in a plan view, the bottom surface of the tuning-fork base portion 5a is affixed to the horizontal portion 7a thereof, and the center of gravity of the tuning-fork-type crystal element 1 including the independent pedestal 7 is positioned towards the tuning-fork base bottom portion 5a side.

This ensures that, when the independent pedestal 7 that has been integrated with the tuning-fork-type crystal element 1 is placed on the horizontal surface in the angular velocity sensor of the present invention, the head part (tip end) of the tuning-fork-type crystal element 1 is held horizontally and does not sag, so that the crystal element 1 can be held in a horizontal state. This ensures that, when the independent pedestal 7 that has been integrated with the tuning-fork-type crystal element 1 is affixed to the inner base surface 9f of the main package 9, the tip end of the tuning-fork-type crystal element 1 is held horizontally without touching the surface of the IC 10, greatly facilitating the work of affixing.

In addition, since the tuning-fork base portion 5a of the angular velocity sensor of the present invention has been previously retained on (integrated with) the independent pedestal 7, it is possible to adjust the frequency and remove unwanted vibrations before the tuning-fork-type crystal element 1 is housed within the main package 9. If a defect occurs during the integration or adjustment of the crystal element, therefore, the tuning-fork-type crystal element 1 can be scrapped together with the independent pedestal 7. This removes the waste involved in scrapping the main package 9 and the IC 10 in such a case.

Since fine adjustments to remove unwanted vibration or the like can be performed on the tuning-fork-type crystal element 1 integrated with the independent pedestal 7 before it is housed in the main package 9, a cylindrical file or the like can be used as the adjustment tool in an open environment. Since the tuning-fork-type crystal element 1 can be adjusted by using a cylindrical file or the like, it is not necessary to increase the external dimensions of the main package 9 itself in a plan view, which can encourage miniaturization of the angular velocity sensor.

Since the thickness of the independent pedestal 7 in the angular velocity sensor of the present invention is greater than the height of the IC 10, the tuning-fork base portion 5a that is the other main surface of the tuning-fork-type crystal element 1 affixed to the independent pedestal 7 is positioned higher than the IC 10 that is disposed on the inner base surface 9f of the cavity 9d of the main package 9. The tuning-fork arms 4a and 4b of the tuning-fork-type crystal element 1 can therefore be disposed on either side above the IC 10, enabling a decrease in a plan view of the external dimensions of the main package 9 (configured of multiple ceramic plates) and the angular velocity sensor.

In addition, since the gap between the pair of perpendicular portions 7b of the U-shaped independent pedestal 7 is wider than the tuning-fork base portion 5, the pair of tuning-fork arms 4a and 4b can be separated from the independent pedestal 7 without touching it, even when the tuning-fork base portion 5a is affixed to the horizontal portion 7a of the independent pedestal 7. This enables favorable maintenance of the vibrations of the tuning fork of the angular velocity sensor.

Embodiment 2

A method of fabricating the angular velocity sensor of the present invention is described below, with reference to FIGS. 1 and 2.

This method of fabricating the angular velocity sensor of the present invention consists of a first step, a second step, and a third step. In the first step, an etching technique using photolithography is used to obtain a large number of tuning-fork-type crystal elements 1 from a Z-cut crystal wafer (not shown in the figures). The tuning-fork base portion 5a of each tuning-fork-type crystal element 1 is then affixed to the corresponding independent pedestal 7, to form an integral structure.

Figure 2:
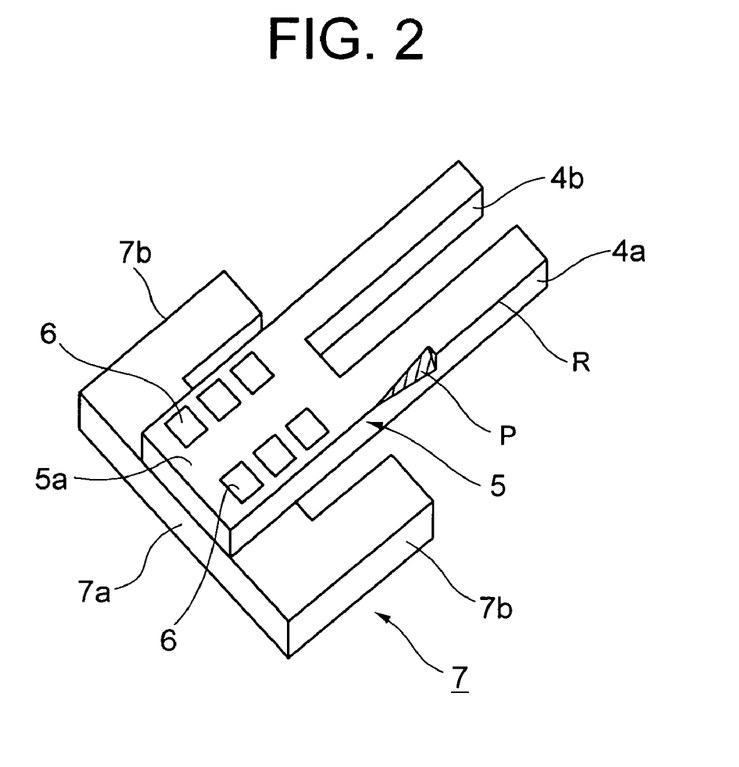
FIG. 2 is illustrative of the tuning-fork-type crystal element of the angular velocity sensor of the present invention, showing a perspective view of the independent pedestal that is integrated with the crystal element.

In the second step, a portion P of the ridgeline portion R on the outer side near the root end of one of the tuning-fork arms 4a and 4b extending from the tuning-fork base portion 5a of the tuning-fork-type crystal element 1 that has been integrated with the independent pedestal 7 is ground as shown in FIG. 2, to remove unwanted vibration. A probe from a predetermined measuring instrument is then brought into contact with each crystal-receiving terminal 6 connected to the excitation and sensor electrodes provided on the other main surface (the front surface) of the tuning-fork base portion 5a.

The cylindrical file is used to grind the portion P of the ridgeline portion R of the tuning-fork arm 4a, while the measuring instrument monitors the results, until unwanted vibration are within a region at which they are minimal. In this case, if the unwanted vibration cannot be made to satisfy predetermined criteria even after this grinding, the defective tuning-fork-type crystal element 1 is scrapped together with the independent pedestal 7.

Finally, in the third step, the independent pedestal 7 that is integrated with the tuning-fork-type crystal element 1 is affixed by adhesive to the inner base surface formed between the step portions 12 along both sides of the main package 9 as shown in FIG. 1B. In this case, the IC 10 has been previously affixed by means such as ultrasonic thermal crimping using a bump to the central region of the main package 9. The crystal-receiving terminals 6a provided on the two step portions 12 and the crystal-receiving terminals 6 provided on the tuning-fork base portion 5a are connected electrically by wire bonding, using the gold wire 8. The open upper surface of the main package 9 is then covered with the cover 11 and sealed by seam welding.

This method of fabricating the angular velocity sensor of the present invention ensures that fine adjustments such as those to remove unwanted vibration are done on the tuning-fork-type crystal element 1 affixed to (integrated with) the independent pedestal 7 before the third step of housing the tuning-fork-type crystal element 1 in the main package 9. Since products that are found to be defective during the holding and adjustment can be removed at this point, this prevents wasteful scrapping of other components such as the main package 9. In addition, since the fine adjustments for removing unwanted vibration of the crystal element can be done in the open outside of the main package 9, it is possible to use a cylindrical file or the like for the adjustment by grinding. This means that the external dimensions of the main package 9 in a plan view do not increase, which can encourage miniaturization of the angular velocity sensor. It also makes it possible to obtain a highly sensitive angular velocity sensor in which unwanted vibration have been removed and which has a low noise component.

Figure 3:
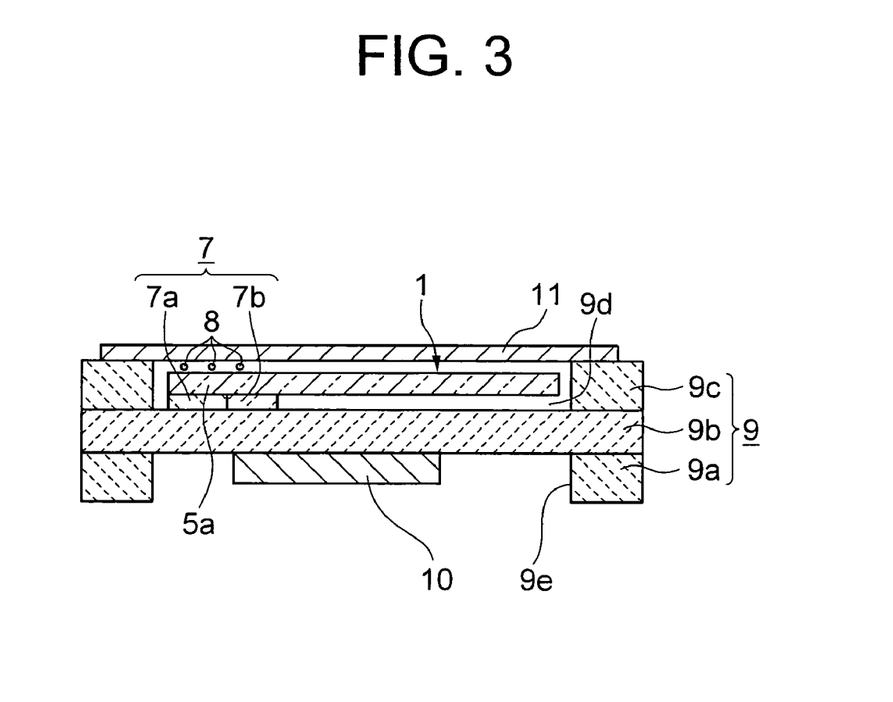
FIG. 3 is a sectional view of another embodiment of the angular velocity sensor of the present invention.

In the above-described Embodiment 2 of the present invention, the main package 9 is formed to have a cavity that defines a single space, but it is also possible to provide two cavities 9d and 9e by forming spaces above and below in an H-shape in section, as shown in FIG. 3. The tuning-fork-type crystal element 1 that has been integrated with the pedestal 7 is housed in one cavity 9d then is hermetically sealed by attaching the cover 11, as previously described. The IC 10 is housed in the other cavity 9e, which is then filled with protective resin or the like (not shown in the figures).

This configuration ensures that the tuning-fork-type crystal element 1 can be superimposed on the IC 10, even if the length of the crystal element is small, enabling smaller dimensions in a plan view. In this case, the cavity 9e that houses the IC 10 need not have inner walls on four sides; it could have them on only two opposite sides by way of example, and only the cavity of the main package 9 in which the tuning-fork-type crystal element 1 is housed need be hermetically sealed.

Figure 4A:
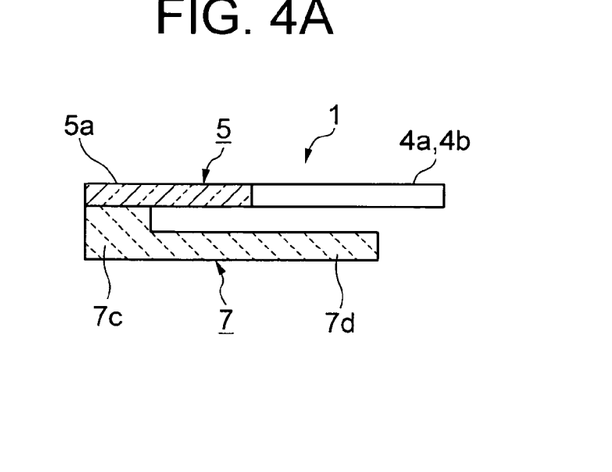
FIGS. 4A and 4B are sectional views of another embodiment of the independent pedestal that is integrated with the crystal element of the present invention.
Figure 4B:
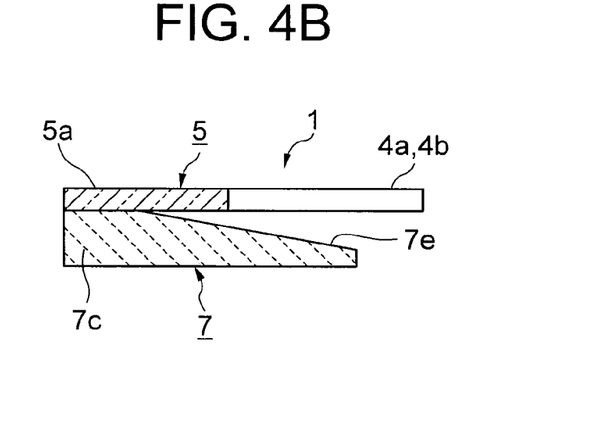

In addition, the independent pedestal 7 was described above as being of uniform thickness with the center of gravity thereof being placed towards the horizontal portion 7a side by the U-shaped configuration thereof, but the shape could equally well be as shown in FIGS. 4A and 4B by way of example. In other words, the independent pedestal 7 shown in FIG. 4A has a stepped shape formed of a thick portion 7c and a thin portion 7d. Alternatively, the thickness could be gradually decreased from the thick portion 7c so that the structure has an oblique portion 7e. In either case, the bottom portion 5a of the tuning-fork base portion 5 of the tuning-fork-type crystal element 1 is affixed to the thick portion 7c and the thin portion 7d or the oblique portion 7e are at the tip end of the tuning-fork-type crystal element 1.

With the independent pedestal 7 of such a configuration too, the center of gravity of the independent pedestal 7 itself is close to the thick portion 7c and also the pair of tuning-fork arms 4a and 4b that are vibration elements are separated therefrom and do not come into contact therewith. Thus, when the bottom portion 5a of the tuning-fork base portion 5 is affixed to the thick portion 7c, the center of gravity of the tuning-fork-type crystal element 1 moves towards the tuning-fork base portion 5a, so that the tip ends of the tuning-fork-type crystal element 1 can be held horizontally without sagging and the vibration of the tuning fork is not impeded. It should be noted however that if the independent pedestal 7 is made U-shaped in a plan view as described above, there is no need for the thick portion 7c and thus the thickness thereof can be reduced.

Note that in this case it is a prerequisite that the main part of the independent pedestal 7 is of the same material, but if the weight of the thick portion 7c is greater than the weight of the thin portion 7d or the oblique portion 7e, the length of the thin portion 7d or the oblique portion 7e can be reduced. Of course, if the weight of the independent pedestal 7 is significantly greater than that of the tuning-fork-type crystal element 1, just the thick portion 7c could be designed to have a shape and weight that ensures that the center of gravity will move towards the tuning-fork base bottom portion 5a side when the independent pedestal 7 is integrated with the tuning-fork-type crystal element 1, to maintain the horizontal alignment of the crystal element 1.

Figure 5:
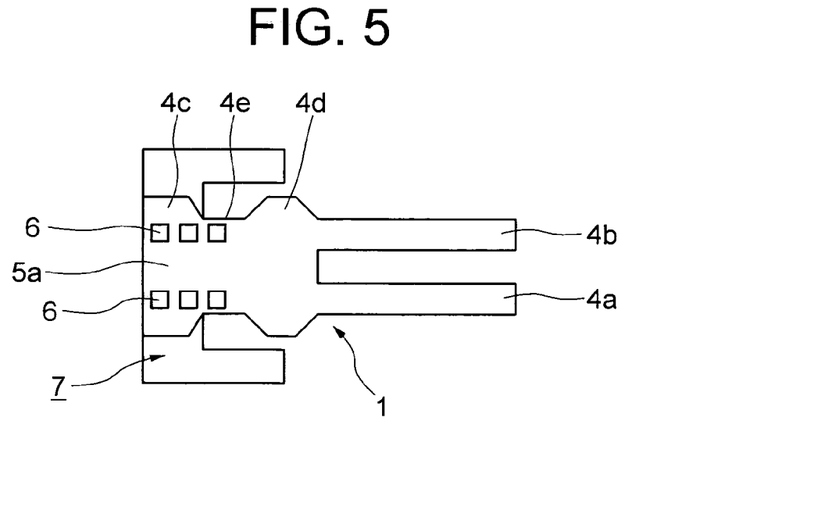
FIG. 5 is a plan view of the tuning-fork-type crystal element that is integrated with the independent pedestal, in another embodiment of the present invention.

The width of the tuning-fork base portion 5a is made the same as the distance between the outer sides of the pair of tuning-fork arms 4a and 4b, but it could also be as shown in FIG. 5 by way of example. In other words, the crystal element 1 could be formed to have a first wide portion 4d and a second wide portion 4c of widths that are greater than the distance between the outer side surfaces of the pair of tuning-fork arms 4a and 4b, from the sides of the tuning-fork arms 4a and 4b, with a narrow portion 4c therebetween. The second wide portion 4c is affixed to the independent pedestal 7 as the tuning-fork base portion 5a. In such a case, oscillation leakage from the pair of tuning-fork arms 4a and 4b can be attenuated by the first wide portion 4d, the second wide portion 4c, and the narrow portion 4c, to obtain favorable oscillation characteristics.

In Embodiment 2 of the present invention, the tuning-fork-type crystal element 1 and the IC 10 are housed in a single space carved out of the main package, but it is also possible to house just the tuning-fork-type crystal element 1 in such a single space. In addition, the tuning-fork-type crystal element 1 is described as being formed of two crystal pieces 1a and 1b that are directly bonded together, but details such as the disposition of the oscillation (drive) electrodes D, sensor electrodes S, and monitor electrode M can be selected as required, even on a single plate, to achieve an electrode distribution for the tuning fork that detects angular velocity.

What is claimed is:

1. An angular velocity sensor comprising:
   a) a tuning-fork-type crystal element which is provided with a drive electrode for exciting the vibration of said tuning fork and a sensor electrode for detecting an electrical charge that is generated in response to an angular velocity that is being detected;
   b) an independent pedestal to which a main surface of a tuning-fork base portion of said tuning-fork-type crystal element is affixed to form an integrated unit: a main package for surface mounting, in which said tuning-fork-type crystal element is hermetically sealed, and which has a cavity with an inner base surface to which said pedestal integrated with said tuning-fork-type crystal element is affixed; and
   c) an IC having:
      i) an oscillation circuit for driving said tuning-fork-type crystal element; and
      ii) a signal processing circuit for creating a signal corresponding to said electrical charge generated in response to the angular velocity, which circuit is disposed either inside or outside said package, wherein said pedestal has a weight and/or shape that ensures that the center of gravity of said tuning-fork-type crystal element that is integrated therewith is positioned toward said tuning-fork base portion side, maintaining the horizontal alignment of said tuning-fork-type crystal element, wherein said pedestal is formed in a stepped shape with a thick portion and a thin portion, said thin portion being on the tip side of said tuning-fork-type crystal element, and said tuning-fork base portion being affixed to said thick portion.

2. The angular velocity sensor as defined by claim 1, wherein said main package has a cavity that is a single space, said IC and said tuning-fork-type crystal element that is integrated with said pedestal being housed in said cavity, said IC being affixed to an inner base surface of said cavity, and said pedestal being taller than said IC and being affixed to the same inner base surface as said IC.

3. The angular velocity sensor as defined by claim 1, wherein said package has an H-shaped section that is provided with cavities that form two spaces, said tuning-fork-type crystal element being hermetically sealed into one cavity, and said IC being disposed in the other cavity.

4. The angular velocity sensor as defined by claim 1, wherein said pedestal is substantially U-shaped in plan view such that each of a pair of perpendicular portions extends from a respective end of a horizontal portion, said pair of perpendicular portions being disposed on the outer sides of said tuning-fork base portion, a gap between said perpendicular portions being greater than the width of said tuning-fork base portion, said tuning-fork base portion being affixed to said horizontal portion.

5. An angular velocity sensor comprising:
   a) a tuning-fork-type crystal element which is provided with a drive electrode for exciting the vibration of said tuning fork and a sensor electrode for detecting an electrical charge that is generated in response to an angular velocity that is being detected;
   b) an independent pedestal to which a main surface of a tuning-fork base portion of said tuning-fork-type crystal element is affixed to form an integrated unit; a main package for surface mounting, in which said tuning-fork-type crystal element is hermetically sealed, and which has a cavity with an inner base surface to which said pedestal integrated with said tuning-fork-type crystal element is affixed; and
   c) an IC having:
      i) an oscillation circuit for driving said tuning-fork-type crystal element; and
      ii) a signal processing circuit for creating a signal corresponding to said electrical charge generated in response to the angular velocity, which circuit is disposed either inside or outside said package, wherein said pedestal has a weight and/or shape that ensures that the center of gravity of said tuning-fork-type crystal element that is integrated therewith is positioned toward said tuning-fork base portion side, maintaining the horizontal alignment of said tuning-fork-type crystal element, wherein said pedestal has an oblique portion that gradually decreases in thickness from a thick portion, said oblique portion being on the tip side of said tuning-fork-type crystal element, and said tuning-fork base portion being affixed to said thick portion.

6. The angular velocity sensor as defined by claim 5, wherein said main package has a cavity that is a single space, said IC and said tuning-fork-type crystal element that is integrated with said pedestal being housed in said cavity, said IC being affixed to an inner base surface of said cavity, and said pedestal being taller than said IC and being affixed to the same inner base surface as said IC.

7. The angular velocity sensor as defined by claim 5, wherein said package has an H-shaped section that is provided with cavities that form two spaces, said tuning-fork-type crystal element being hermetically sealed into one cavity, and said IC being disposed in the other cavity.

8. The angular velocity sensor as defined by claim 5, wherein said pedestal is substantially U-shaped in plan view such that each of a pair of perpendicular portions extends from a respective end of a horizontal portion, said pair of perpendicular portions being disposed on the outer sides of said tuning-fork base portion, a gap between said perpendicular portions being greater than the width of said tuning-fork base portion, said tuning-fork base portion being affixed to said horizontal portion.

9. An angular velocity sensor comprising:
   a) a tuning-fork-type crystal element which is provided with a drive electrode for exciting the vibration of said tuning fork and a sensor electrode for detecting an electrical charge that is generated in response to an angular velocity that is being detected:
   b) an independent pedestal to which a main surface of a tuning-fork base portion of said tuning-fork-type crystal element is affixed to form an integrated unit; a main package for surface mounting, in which said tuning-fork-type crystal element is hermetically sealed, and which has a cavity with an inner base surface to which said pedestal integrated with said tuning-fork-type crystal element is affixed; and
   c) an IC having:
      i) an oscillation circuit for driving said tuning-fork-type crystal element; and
      ii) a signal processing circuit for creating a signal corresponding to said electrical charge generated in response to the angular velocity, which circuit is disposed either inside or outside said package, wherein said pedestal has a weight and/or shape that ensures that the center of gravity of said tuning-fork-type crystal element that is integrated therewith is positioned toward said tuning-fork base portion side, maintaining the horizontal alignment of said tuning-fork-type crystal element, wherein said tuning-fork base portion is formed from a first wide portion and a second wide portion of widths greater than the distance between outer side surfaces of said pair of tuning-fork arms, with a narrow portion of said tuning-fork base portion therebetween.

10. The angular velocity sensor as defined by claim 9, wherein said main package has a cavity that is a single space, said IC and said tuning-fork-type crystal element that is integrated with said pedestal being housed in said cavity, said IC being affixed to an inner base surface of said cavity, and said pedestal being taller than said IC and being affixed to the same inner base surface as said IC.

11. The angular velocity sensor as defined by claim 9, wherein said package has an H-shaped section that is provided with cavities that form two spaces, said tuning-fork-type crystal element being hermetically sealed into one cavity, and said IC being disposed in the other cavity.

12. The angular velocity sensor as defined by claim 9, wherein said pedestal is substantially U-shaped in plan view such that each of a pair of perpendicular portions extends from a respective end of a horizontal portion, said pair of perpendicular portions being disposed on the outer sides of said tuning-fork base portion, a gap between said perpendicular portions being greater than the width of said tuning-fork base portion, said tuning-fork base portion being affixed to said horizontal portion.

* * * * *